United States Patent
Van Lookeren et al.

(10) Patent No.: US 7,014,689 B2
(45) Date of Patent: Mar. 21, 2006

(54) BODY FOR ISOLATING A CONSTITUENT CONTAINED IN A GAS MIXTURE

(75) Inventors: Constant Van Lookeren, Bilthoven (NL); Manfred Nebelung, Dresden (DE); Hagen Klemm, Dresden (DE)

(73) Assignee: IPC Process Center GmbH & Co., Dresden (DE)

( * ) Notice: Subject to any disclaimer, the term of this patent is extended or adjusted under 35 U.S.C. 154(b) by 11 days.

(21) Appl. No.: 10/494,910

(22) PCT Filed: Nov. 6, 2002

(86) PCT No.: PCT/DE02/04158

§ 371 (c)(1),
(2), (4) Date: May 7, 2004

(87) PCT Pub. No.: WO03/040259

PCT Pub. Date: May 15, 2003

(65) Prior Publication Data

US 2005/0072305 A1    Apr. 7, 2005

(30) Foreign Application Priority Data

Nov. 8, 2001 (DE) ............... 101 55 643

(51) Int. Cl.
*B01D 53/04* (2006.01)
*B01D 53/52* (2006.01)

(52) U.S. Cl. .............. 96/108; 55/523; 55/DIG. 5; 95/136; 96/143; 423/230

(58) Field of Classification Search ............ 96/108, 96/143, 153, 154; 95/136; 423/230; 55/523, 55/DIG. 5
See application file for complete search history.

(56) References Cited

U.S. PATENT DOCUMENTS

| | | | | |
|---|---|---|---|---|
| 4,292,285 A | * | 9/1981 | Nakao et al. | 423/210 |
| 4,358,297 A | * | 11/1982 | Eberly, Jr. | 95/136 |
| 4,548,196 A | * | 10/1985 | Torobin | 126/654 |
| 4,637,990 A | | 1/1987 | Torobin | 502/10 |
| 4,671,909 A | * | 6/1987 | Torobin | 264/43 |
| 4,793,980 A | | 12/1988 | Torobin | |
| 4,826,516 A | * | 5/1989 | Matsuoka et al. | 96/118 |
| 4,869,739 A | * | 9/1989 | Kanome et al. | 96/153 |
| 5,224,972 A | * | 7/1993 | Frye et al. | 95/9 |
| 5,250,089 A | * | 10/1993 | Delzer et al. | 95/136 |
| 6,150,300 A | | 11/2000 | Khare et al. | |
| 6,197,092 B1 | | 3/2001 | Butwell et al. | |
| 6,284,021 B1 | * | 9/2001 | Lu et al. | 95/96 |
| 6,350,422 B1 | * | 2/2002 | Khare et al. | 423/230 |
| 6,428,761 B1 | * | 8/2002 | Shore et al. | 423/244.01 |
| 6,660,240 B1 | * | 12/2003 | Toshihiko et al. | 423/247 |
| 6,736,882 B1 | * | 5/2004 | Kanazirev et al. | 96/108 |
| 2002/0018853 A1 | * | 2/2002 | Khare | 427/387 |
| 2002/0178915 A1 | * | 12/2002 | Shore et al. | 95/136 |
| 2003/0097929 A1 | * | 5/2003 | Watanabe et al. | 95/90 |

FOREIGN PATENT DOCUMENTS

| | | |
|---|---|---|
| EP | 1 080 771 | 3/2001 |
| FR | 2 794 993 | 12/2000 |
| JP | 2001 009271 | 1/2001 |

OTHER PUBLICATIONS

Patent Abstract of Japan: vol. 1997, No. 07, Jul. 31, 1997*.
Patent Abstract of Japan: (Sangyo Shinko KK; Osaka Seitetsu KK), Mar. 25, 1997*.
Database WPI, Section Ch., Week 200135, Derwent Publications Ltd., London, GB Class E36, AN 2001-331336 XP002236551*.

* cited by examiner

Primary Examiner—Robert H. Spitzer
(74) Attorney, Agent, or Firm—Kenyon & Kenyon

(57) ABSTRACT

The invention relates to bodies for separating out a component contained in a gas mixture. The gas mixtures may, for example, be crude gases which contain hydrocarbons, such as natural gas, or exhaust gas. According to the object which is set, the bodies according to the invention are intended to be able to separate components out of gas mixtures over longer periods of time with an approximately constant performance. The body according to the invention has regions which are active in the separation and are formed from a porous shell. These bodies which have a porous shell can be used in a device, and at least one bed formed from a bulk mass of these bodies may be present within a vessel, with the gas mixture being passed through this bed in order for the undesired component to be separated out. The invention is particularly advantageously suited to separating sulfur compounds out of gas mixtures.

19 Claims, 2 Drawing Sheets

BODY FOR ISOLATING A CONSTITUENT CONTAINED IN A GAS MIXTURE

FIELD OF THE INVENTION

The invention relates to a process for producing hollow bodies for separating out a component contained in a gas mixture. The gas mixtures may, for example, be crude gases which contain hydrocarbons, such as natural gas, or exhaust gas. In this way, harmful components which are contained in gas mixtures of this type, such as for example, sulfur, including in the form of compounds, can be removed, in order for the gas mixture to be made available for further use and processing without any negative properties or in order for gas which does not contain harmful components to be discharged to the environment. Moreover, it is also possible to separate out nitrogen or nitrogen oxides, in order either to improve suitability for combustion or to ensure that exhaust gases which are virtually free of nitrogen oxides are discharged to the environment. Furthermore, it is also possible to separate out phosphorus, halogens or compounds thereof.

BACKGROUND OF THE INVENTION

A wide range of solutions are known for separating out the various components, with different chemical reactions or even physical effects being exploited for the particular component which is to be separated out and may be in elemental form or in the form of a chemical compound.

In many cases, gas mixtures of this type are purified by means of solid substances, in which case the separation is effected by sorption. In this case, in each case the usable surface area of the substance used plays a role in ensuring a higher separation capacity. It is known that it is possible to increase surface area by means of the geometric configuration and in particular the specific surface area of a substance by means of the porosity.

However, it is known that porosity and mechanical strength are precisely contradictory, and consequently limits are imposed on the porosity. Limits are also imposed on the use of strength-increasing binders, since the latter have an adverse effect on the separation properties.

Hitherto, correspondingly suitable substances, mainly chemical compounds in granule form with a very wide range of grain sizes, have been used to separate out components, and a suitable porosity has often been set by corresponding sintering.

The gas mixture which is to be purified or from which a component is to be removed is then passed through a fixed bed formed from a bulk mass of the granules and the component to be separated out is in each case removed by sorption. The bed in this case forms a throttling area for the gas stream, so that a back pressure which is influenced by the grain size and the dimensioning of the bed is observed at the entry side. This requires increased power for conveying the gas. On account of the reduced mechanical strength of the substance used in porous form, abrasion occurs, which impedes the gas flow, and this effect may considerably limit the service life of a bed, with the result that the bed has to be exchanged at relatively short intervals of time.

It is known that any substance which is suitable for separation, substantially influenced by the usable surface area and mass, has a limited separation capacity and a saturation range, and consequently complete utilization is not generally possible.

Moreover, during the separation, it is desirable to ensure an approximately constant separation performance over a prolonged period of time. This means separating out a virtually constant quantity (mass) of the component per unit time. Here, however, known solutions have significant deficiencies, since the separation capacity drops over the course of utilization, and this effect occurs well before the saturation limit is reached. A user must accept either a reduced degree of purity of the treated gas or a shorter effective service life. The latter generally means that the separation-regeneration cycle has to be carried out at shorter intervals, which of course entails increased installation and operating costs.

SUMMARY OF THE INVENTION

Therefore, it is an object of the invention to propose a solution which allows components to be separated out of gas mixtures for prolonged periods of time with an approximately constant performance.

According to the invention, this object is achieved by hollow bodies which can be produced as described herein, and which can be employed in a device as described herein. In addition, advantageous configurations and refinements can be achieved by means of the features described herein.

According to the invention, hollow bodies whose region which is active in the separation is designed in the form of a porous shell are to be used for separating certain components out of gas mixtures.

This shell surrounds at least one cavity on all sides, so that a closed body is formed. The term cavity is not intended to include the individual pores.

This body is particularly preferably curved spherically and designed as a hollow sphere. A sphere shape of this type is not only advantageous on account of the sphere geometry with a large surface area, but also offers favorable fluid dynamic conditions if a gas mixture is passed through a bed formed from such bodies during the separation, since a correspondingly reduced back pressure can be achieved at the entry side of a bed of this type.

In addition to these properties, an increased mechanical strength at a lower mass can also be achieved, on account of the specific shape.

Surprisingly, the shell shape with a correspondingly limited thickness, up to at most 5 mm, preferably less than 2 mm, can also ensure a virtually constant separation performance over a long usable period, with this saturation performance being ensured at least almost up to the saturation limit. Consequently, it is possible to improve the separation quality, and accordingly the purity level of the treated gas can also be kept constant and, moreover, the operating costs can be reduced.

The hollow bodies according to the invention can be used for separation at least up to a loading level which is close to the saturation limit without the gas purity being significantly affected.

Bodies in spherical form are to be produced in a manner which is known per se. A powder which substantially comprises a substance which is suitable for the particular component to be separated out is applied as a dispersion/suspension to a spherical core and is subjected to sintering after drying. The core may consist of a material which is inactive in the separation, in which case, however, the thermal characteristics of this substance should be taken into account in terms of the thermal expansion and contraction during sintering, in order as far as possible to avoid the formation of cracks in the shell. The core may also consist of an organic material, e.g. prefoamed polystyrene, which can be reliably expelled at temperatures below 700° C., so that in these cases the bodies are in the form of hollow spheres.

In the case of bodies in spherical form, the ratio of the external diameter to the shell thickness should be in the range from 2:1 to 10:1, with the lower ratios being preferred for small external diameters of the bodies. As far as possible, the shell thickness should be no greater than 3 mm, and an upper limit of 8 mm should not be exceeded.

The mechanical strength and porosity of the shell can be influenced by the powder used, in particular its grain size, if appropriate with additives which remain in the shell, and the sintering conditions. The sintering should be carried out in such a way that a mechanical strength which is just sufficient combined with the maximum possible porosity is achieved.

The external dimensions (external diameter) and the mass of the bodies according to the invention may be varied according to the particular application, while the porosity can be kept constant.

Sintering aids which are known per se, e.g. $SiO_2$, can be added to the powder. The level of $SiO_2$ should be less than 10% by mass, preferably less than 5% by mass.

The shell may be formed from various substances. It may be formed from metal oxides or metal oxide mixtures, in which case oxides of divalent metals are preferred. For example, to separate out sulfur in the form of hydrogen sulfide using oxides of divalent metals (e.g., Cu, Fe, Co, Ni, Zn), it can be separated out of a gas mixture, such as for example natural gas, by chemical transformation.

For example, ZnO reacts with $H_2S$ to form ZnS and $H_2O$. ZnS is more chemically stable than $H_2S$ and can be held at the body in solid form.

During a regeneration operation which is to be carried out at defined time intervals, if possible before the saturation limit is reached, ZnS can react with $H_2O$ to form sulfuric acid, with ZnO being formed again in the shell at the same time, which can then be used for further separation.

In particular for separating out $H_2S$ which is present in relatively high concentrations in a gas mixture, in addition to hollow bodies whose shell is substantially formed from ZnO, it is also possible to use bodies made from $Al_2O_3$ as catalyst. In this case, the $Al_2O_3$ may likewise form the shell of a hollow body of this type. Then, with these catalysts and the ZnO bodies, it is possible to carry out what is known as the Claus process, in which $SO_2$ and $2H_2S$ react catalytically to form 3S and $2H_2O$.

It is also possible for certain zeolites, which are likewise known per se, to be used to separate out sulfur compounds.

Zeolites, as described for example in U.S. Pat. No. 6,197,092, can also be used in the form of what are known as molecular sieves to separate out nitrogen, in which case this can advantageously be effected by means of a pressure swing adsorption (PSA) process which is likewise mentioned in that document.

Molecular sieves of this type can also be used to separate out phosphorus, halogens or compounds thereof.

If nitrogen oxides are to be separated, for example, out of an exhaust-gas stream, it is possible for the shell material used to be $BaCO_3$, which reacts with $NO_2$ to form BaO. In this case too, regeneration is possible. In this case, the BaO which is formed is heated (T approx. 450° C.), and $BaCO_3$ can be formed again with carbon compounds (e.g. $CO_2$).

However, to separate out other elements or compounds, it is also possible to use other carbonates.

Since the regeneration and also the separation predominantly involves the use of elevated temperatures, the reduced mass of the bodies according to the invention, which are substantially formed from the shells, has a beneficial effect on account of the reduction in the thermal energy required. Of course, the amount of material required for the substance used for separation is also lower. In this case, approximately the same quantity of the substance in question is taken up from the gas mixture and can be separated out by means of a lower mass of substance.

However, the hollow bodies according to the invention can also be used for gas drying and may, for example, withdraw water or water vapor from a gas/gas mixture.

The hollow bodies according to the invention can be used in devices in which at least one so-called fixed bed is formed from a bulk mass of the hollow bodies in vessels through which a gas mixture is passed for the separation to be carried out. However, the hollow bodies may also, in particular on account of their increased strength for the same porosity, form a fluidized or fluid bed, in which case the gas mixture is used with an increased volumetric flow. A bed of this type can also be formed by hollow bodies which are moving as a result of gravitational or mechanical forces. The hollow bodies can in this case be fed continuously to the region of a bed of this type which is active in the separation, hollow bodies which are laden with the component to be separated out can be discharged from the bed, fed to regeneration and then recirculated.

In this case, the gas mixture to be separated flows through this bed, where a component is retained by chemical and/or physical effects, so that gas which emerges from this bed or from a cascade of a plurality of beds of this type is as far as possible free of this component.

If the saturation limit of the hollow bodies in the bed or beds for the particular component to be separated out has almost been reached, it is necessary to carry out a regeneration. This can be achieved by the supply of heat, i.e. by heating of the beds and/or the vessels as a whole. In particular where ZnS is formed, the regeneration can also be effected by water being supplied. In this case, water vapor or alternatively fluid which contains water vapor can be passed through the bed in order to cause ZnS to be converted back into ZnO.

To allow continuous gas purification/separation to be carried out, it is advantageous for at least two such vessels of identical design to be arranged in parallel and to be operated alternately. Accordingly, gas purification/separation is carried out in one of the vessels while the hollow bodies in the other vessel are being regenerated. In this case, the time required for the regeneration should at least be shorter than the time within which a significant decrease in the separation capacity with reduced loading per unit time occurs in the other vessel. The gas stream can be passed through the corresponding vessel by suitable switching of valves, so that a constant purity of the emerging gas stream with regard to the corresponding component can be achieved.

The switching from one vessel to the other can be carried out with open-loop time control or closed-loop control; in the latter case, the concentration of the corresponding component in the emerging gas stream is determined, and if a limit value is exceeded the switching of the gas stream into a different vessel is initiated.

The hollow bodies which form the one or more beds as a bulk mass may have at least approximately equal external dimensions/external diameters in a bed. Hollow bodies with different dimensions can be used in a plurality of beds which form a cascade, and there is the option of using hollow bodies with different external dimensions/external diameters in a single bed.

In any event, the flow conditions of the gas mixture as it flows through should, however, be influenced in such a way that the pressure drop is minimized yet nevertheless a contact or residence time in the beds which is sufficient for the separation to be carried out is achieved.

The hollow bodies according to the invention should be present in the form of a loose bulk mass in the beds, without any binders.

It is advantageously also possible for a catalytically active substance to additionally be present in the beds, which facilitates or allows the separation and may also be used to reduce the reaction time and/or energy required.

A catalytically active substance of this type, for example platinum, may also be present at the surface of such hollow bodies or a hollow body of this type may be doped therewith.

For example, nitrogen monoxide can be catalytically oxidized to form nitrogen dioxide, and nitrogen dioxide can be separated out of an exhaust gas by chemical reaction with $BaCO_3$.

DETAILED DESCRIPTION

Figure 1:
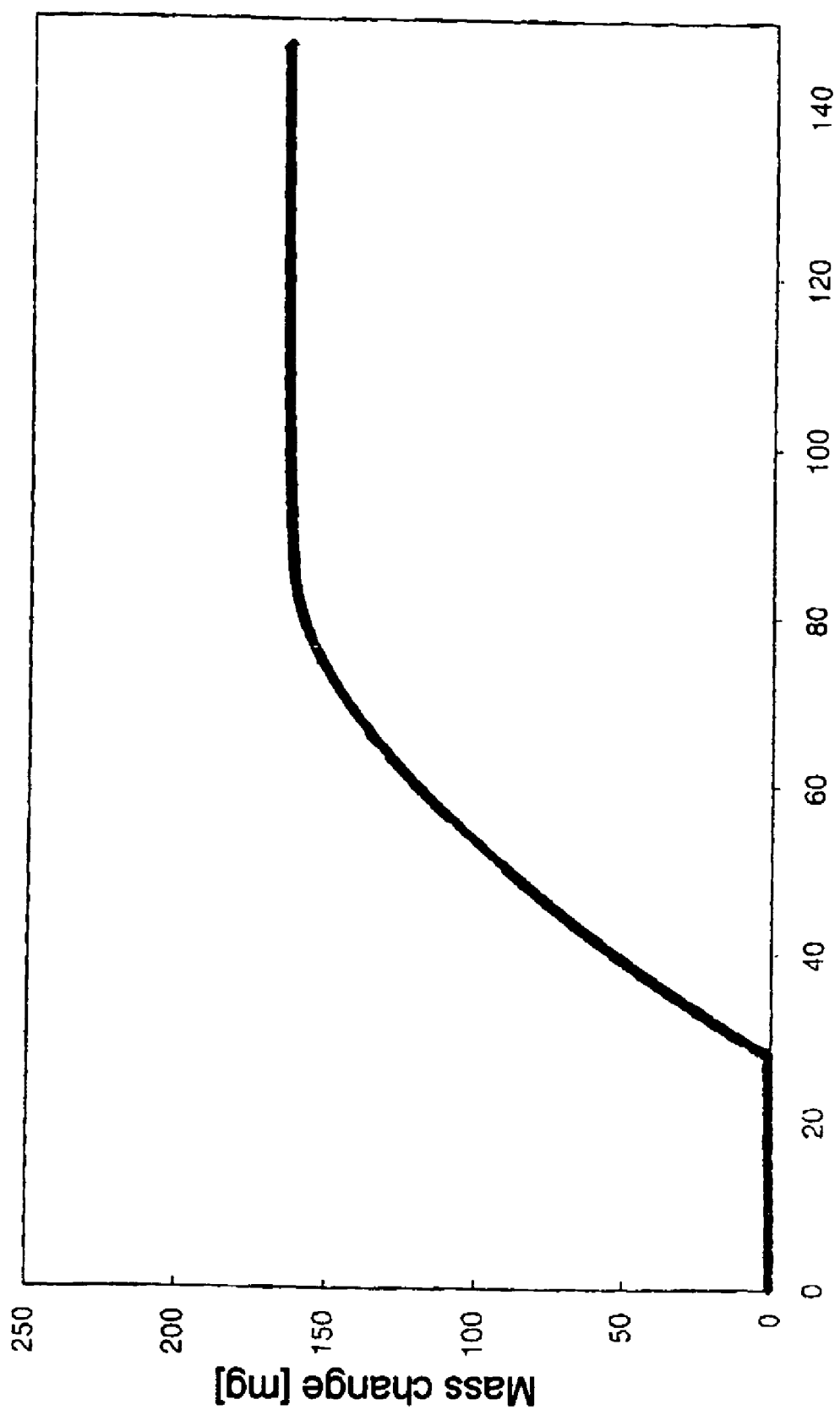
FIG. 1 shows a diagram illustrating the time curve of the separation capacity of a comparative example.
Figure 2:
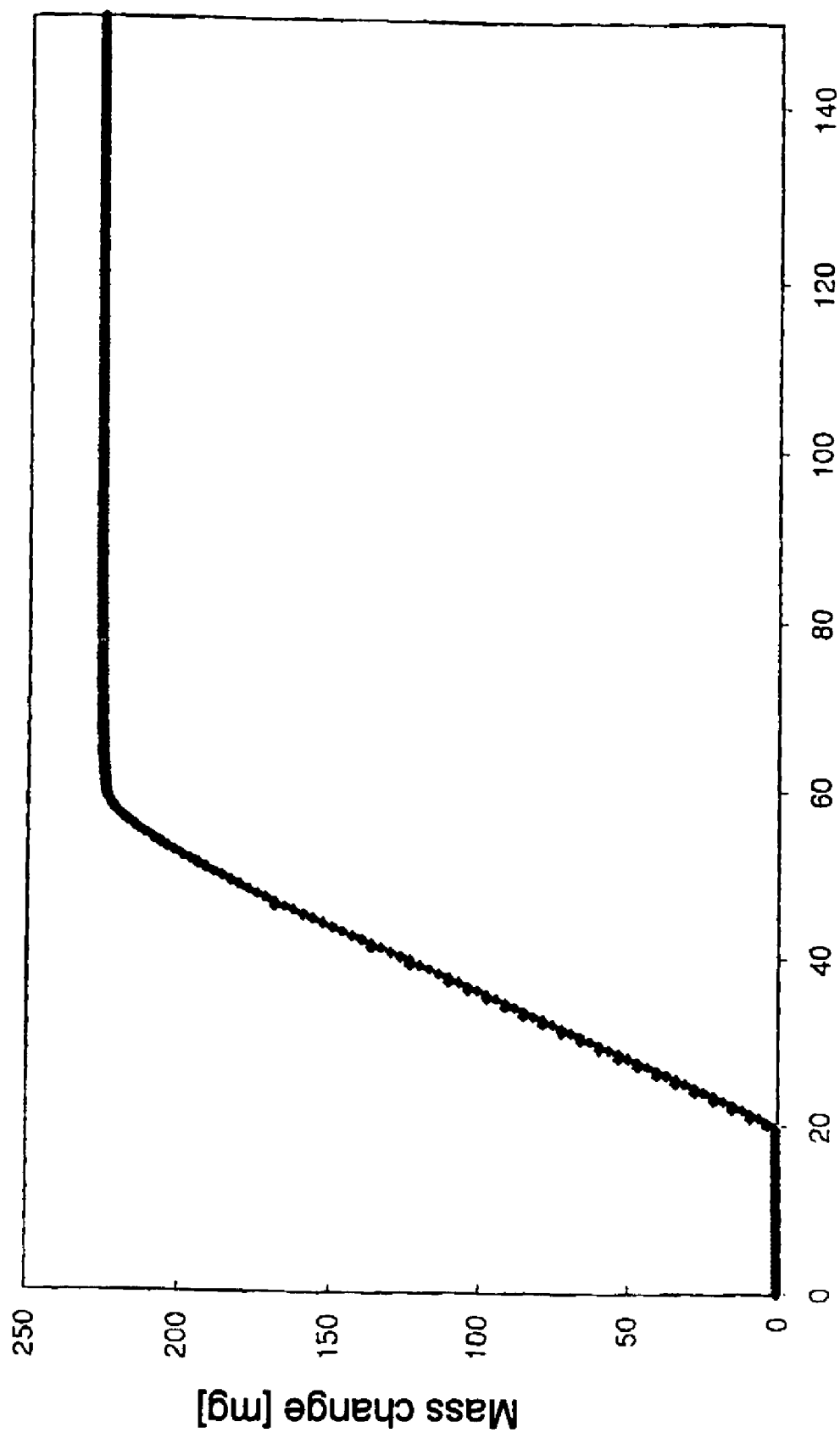
FIG. 2 shows a diagram illustrating the time curve of the separation capacity which has been determined using bodies according to the invention.

The invention is to be explained below by way of example. In particular, the continuous separation capacity which can be achieved by hollow bodies according to the invention for separating hydrogen sulfide out of a gas mixture is to be demonstrated by comparison with inherently comparable bodies.

In this case, firstly solid spheres, as a comparative example, and secondly hollow spheres, as hollow bodies according to the invention, were produced.

In both cases, ZnO was processed with 2% by mass of $SiO_2$ to form spheres. The comparative spheres had an external diameter of between 2.3 and 2.4 mm, and the hollow spheres according to the invention had an external diameter of approx. 2.9 mm. The internal diameter of the hollow spheres according to the invention was approx. 1 mm, and consequently the shell which is active in separation had a thickness of approx. 0.9 mm. Both types of bodies were produced under identical conditions, in particular with regard to the starting powders used and the sintering.

Accordingly, it was possible to set an identical porosity of approx. 78%. The bulk density of the comparative bodies was 0.85 g/ml and of the hollow bodies according to the invention was 0.79 g/ml. The specific breaking strength of the hollow bodies according to the invention was 2.9 MPa, whereas the solid spheres only reached 1.99 MPa. The specific surface area of the comparative bodies was 41.7 $m^2/g$, and that of the hollow bodies according to the invention was 48.6 $m^2/g$.

In both cases, a bulk mass of bodies of this type, with a total mass of 870 mg (comparison) and 1140 mg (invention), was exposed to a nitrogen atmosphere containing hydrogen sulfide. Volumetric flows of 17.0 ml/min of nitrogen and 7.0 ml/min of hydrogen sulfide were supplied continuously at a pressure of 1 bar above atmospheric pressure.

The temperature was kept constant at 400° C. The loading was measured over the course of time in mg.

After a test-related initial phase, it was possible to demonstrate a significantly more constant rise in the mass of the bulk bed formed from the hollow bodies according to the invention.

By contrast, the rise in the mass increase representing the separation of hydrogen sulfide out of the gas mixture, at least after approx. 50% of the maximum separation capacity had been reached, i.e. before the saturation limit was reached, decreased significantly in the case of the solid comparison bodies. The result of this is that, after a certain time, significantly less hydrogen sulfide can be separated out and chemically converted into ZnS than is possible with the hollow spherical bodies according to the invention.

In both tests, it was possible to separate out a total mass of 332 g/l of hydrogen sulfide. With the example according to the invention, it was possible to achieve this mass after just 38 min., whereas the comparison bodies required 57 min., which is also evidence of an increased separation action, i.e. hydrogen sulfide can be separated out of a gas mixture not just more quickly but also in a larger quantity, and the purity of a gas mixture treated in this way is higher.

If the time curve of the hydrogen sulfide uptake at the comparison bodies and the hollow bodies according to the invention is compared up until 50% is reached, as $v_1=10.3$ mg/g*min in the case of the comparative example and $v_1=11.9$ mg/g*min in the case of the example according to the invention, and after this 50% level has been reached through to saturation $v_2=5.1$ mg/g*min (comparison) and $v_2=10.5$ mg/g*min (invention), the ratio $v_2/v_1$ is 0.5 for the comparison bodies and 0.88 for the hollow bodies according to the invention, which is further evidence of the more uniform separation achieved.

Therefore, separation can be carried out more uniformly and closer to the saturation limit without the degree of purity of the treated gas mixture deteriorating significantly.

The invention claimed is:

1. A device for separating out a component contained in a gas mixture, the device comprising:
   a vessel containing at least one bed through which the gas mixture is passed;
   wherein the at least one bed comprises a plurality of porous, hollow bodies, wherein each of the bodies comprises:
   a porous shell containing a substance which is suitable for separating out the component contained in the gas mixture;
   wherein the shell has an external diameter and a thickness, with a ratio of the external diameter to the thickness in the range of from 2:1 to 10:1, and a ratio v2/v1 of between 0.5 and 0.9, wherein v1 is an achievable increase in mass of the component contained in the gas mixture in mg/g*time until 50% of a maximum separation capacity is reached, and v2 is an increase in mass of the component contained in the gas mixture in mg/g*time after the 50% of the maximum separation capacity has been reached up to a saturation limit.

2. The device of claim 1, wherein the plurality of porous, hollow bodies include shells having different external diameters and different thicknesses.

3. The device of claim 1, wherein the at least one bed further comprises a catalytically active substance.

4. A porous hollow body comprising:
   a porous shell containing a substance which is suitable for separating out a component contained in a gas mixture;
   wherein the shell has an external diameter and a thickness, with a ratio of the external diameter to the thickness in the range of from 2:1 to 10:1, and a ratio v2/v1 of between 0.5 and 0.9, wherein v1 is an achievable increase in mass of the component contained in the gas mixture in mg/g*time until 50% of a maximum separation capacity is reached, and v2 is an increase in mass of the component contained in the gas mixture in mg/g*time after the 50% of the maximum separation capacity has been reached up to a saturation limit.

5. The hollow body of claim 4, wherein the substance which is suitable for separating out a component contained in a gas mixture is a metal oxide, and wherein the shell contains at least 90% by mass of the metal oxide.

6. The hollow body of claim 4, wherein the substance which is suitable for separating out a component contained in a gas mixture is a zeolite, and wherein the shell contains at least 90% by mass of the zeolite.

7. The hollow body of claim 6, wherein the zeolite forms a molecular sieve.

8. The hollow body of claim 4, wherein the thickness is in the range of 0.5 mm to 8 mm.

9. The hollow body of claim 8, wherein the thickness is in the range of 0.5 mm to 2 mm.

10. The hollow body of claim 4, wherein the external diameter is in the range of 1 mm to 15 mm.

11. The hollow body of claim 4, wherein the hollow body has a breaking strength in the range of 2 MPa to 2.9 MPa.

12. The hollow body of claim 4, wherein the hollow body has a bulk density of less than 0.85 g/ml.

13. The hollow body of claim 4, wherein the hollow body has a specific surface area in the range of 42 $m^2$/g to 48.6 $m^2$/g.

14. The hollow body of claim 4, wherein the hollow body has a volumetric saturation value which is at least 80% of the maximum stoichiometric saturation value.

15. The hollow body of claim 4, wherein the component comprises $H_2S$, and the hollow body has a volumetric saturation value of greater than or equal to 7.5 mol/l of a saturation limit.

16. A process for producing hollow porous bodies for separating out a component contained in a gas mixture, comprising:

applying a dispersion or a suspension to a core comprising an organic material to form a body, wherein the dispersion or the suspension contains a powder comprising at least 90% by mass of a substance which is suitable for separating out the component;

drying the body; and sintering the body;

wherein the organic material is expelled during at least one of the drying and the sintering.

17. The process of claim 16, wherein the substance which is suitable for separating out the component is a metal oxide.

18. The process of claim 16, wherein the substance which is suitable for separating out the component is selected from the group consisting of zinc oxide, zeolite, $BaCO_3$, CuO, FeO, CoO, NiO, $Al_2O_3$, and combinations thereof.

19. The process of claim 16, wherein the organic material comprises a prefoamed polystyrene.

* * * * *